US009984654B2

(12) United States Patent
Kumar et al.

(10) Patent No.: US 9,984,654 B2

(45) **Date of Patent: *May 29, 2018**

(54) DISPLAY DRIVER CAPABLE OF DRIVING MULTIPLE DISPLAY INTERFACES

(71) Applicant: Intel Corporation, Santa Clara, CA (US)

(72) Inventors: Aruna Kumar, Bangalore (IN); Prakash K. Radhakrishnan, Portland, OR (US); Pravas Pradhan, Bangalore (IN); Sunil Kumar C R, Bangalore (IN); Vikas J, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/595,853

(22) Filed: May 15, 2017

(65) Prior Publication Data

US 2017/0249922 A1 Aug. 31, 2017

Related U.S. Application Data

(60) Continuation of application No. 15/359,401, filed on Nov. 22, 2016, now Pat. No. 9,653,040, which is a division of application No. 14/142,320, filed on Dec. 27, 2013, now Pat. No. 9,503,288.

(51) Int. Cl.
*G09G 5/00* (2006.01)

(52) U.S. Cl.
CPC ......... *G09G 5/006* (2013.01); *G09G 2300/08* (2013.01); *G09G 2310/027* (2013.01); *G09G 2330/021* (2013.01); *G09G 2330/028* (2013.01); *G09G 2370/08* (2013.01); *G09G 2370/10* (2013.01); *G09G 2370/12* (2013.01)

(58) Field of Classification Search
CPC .................................................. G09G 2370/08
See application file for complete search history.

(56) References Cited

U.S. PATENT DOCUMENTS

2008/0254588 A1 10/2008 Chuang et al.
2011/0133780 A1 6/2011 Shau
2012/0182273 A1 7/2012 Ninomiya et al.
2013/0235039 A1 9/2013 Montag

OTHER PUBLICATIONS

Non-Final Office Action from U.S. Appl. No. 14/142,320, dated Jan. 26, 2016, 8 pages.
Notice of Allowance from U.S. Appl. No. 14/142,320, dated Jul. 22, 2016, 8 pages.
Notice of Allowance from U.S. Appl. No. 15/359,401, dated Jan. 12, 2017, 12 pages.
Restriction Requirement from U.S. Appl. No. 14/142,320, dated Sep. 9, 2015, 6 pages.

*Primary Examiner* — Robin Mishler
(74) *Attorney, Agent, or Firm* — Nicholson De Vos Webster & Elliott LLP

(57) ABSTRACT

A semiconductor chip is described. The semiconductor chip includes a display controller having a driver. The display controller is configurable to select a first, a second, a third and a fourth different display interface. The driver is designed to drive respective signals for each of the first, second, third and fourth interfaces through a single output.

17 Claims, 6 Drawing Sheets

| | LOWER POWER PORTION ENABLED HIGH SPEED PORTION DISABLED | LOWER POWER PORTION DISABLED HIGH SPEED PORTION ENABLED | |
|---|---|---|---|
| | | DP/HDMI | eDP/highspeed mipi DSI |
| Q1 | OFF | ON | OFF |
| Q2 | OFF | OFF | ON |
| Q3 | OFF | ON | ON |
| Q4 | ON | OFF | OFF |
| Q5 | ON | OFF | OFF |
| PROTECTION SWITCHES | CLOSED | OPEN | OPEN |
| VOLTAGE REGULATOR OUTPUT | 1.0V | 1.0V | 0.4V |

FIG. 3

DISPLAY DRIVER CAPABLE OF DRIVING MULTIPLE DISPLAY INTERFACES

CROSS-REFERENCE TO RELATED APPLICATIONS

The present patent application is a continuation application claiming priority from U.S. patent application Ser. No. 15/359,401, filed Nov. 22, 2016, and titled: "Display Driver Capable of Driving Multiple Display Interfaces", which is a divisional application claiming priority from U.S. patent application Ser. No. 14/142,320, filed Dec. 27, 2013, and titled: "Display Driver Capable of Driving Multiple Display Interfaces", both of which are incorporated herein by reference in their entirety.

FIELD OF THE INVENTION

The field of invention relates generally to semiconductor chip design and, more specifically, to a display driver capable of driving multiple display interfaces.

BACKGROUND

There are presently a myriad of display interface standards available to integrated circuit designers who design display controllers. Display controllers are circuits that control and determine the specific information and signaling directed to a display such as a liquid crystal display (LCD) or Light Emitting Diode (LED) display. Display interfaces are the circuits that actually transport the information to the display via electrical signaling. Each display interface typically has its own set of electrical signaling requirements. Part of the reason for the existence of various display interfaces is the history of display technology. Specifically, some display interfaces have evolved from television while others have evolved from computing systems.

With the convergence of computing and television, any of these standards would seem to be available for use. Therefore display controller designers are faced with the challenge of trying to integrate a multitude of different interfaces on a single semiconductor die. The incorporation of a large number of different interfaces (e.g., Display Port (DP), embedded Display Port (eDP), High Definition Multimedia Interface (HDMI), high speed Mobile Industry Processor Interface (MIPI) Display Serial Interface (DSI), low power MIPI DSI, etc.) is inefficient in terms of the silicon die real estate that is consumed incorporating a unique and custom circuit for each different interface the display controller is to support.

Moreover, even if the consumption of silicon die surface area were not a problem, the number of I/Os (e.g., solder balls) that each unique interface would introduce to the overall I/O count of the die could very well be prohibitive.

FIGURES

The following description and accompanying drawings are used to illustrate embodiments of the invention. In the drawings:

FIG. 3 shows different states of the driver;

DETAILED DESCRIPTION

Figure 1:
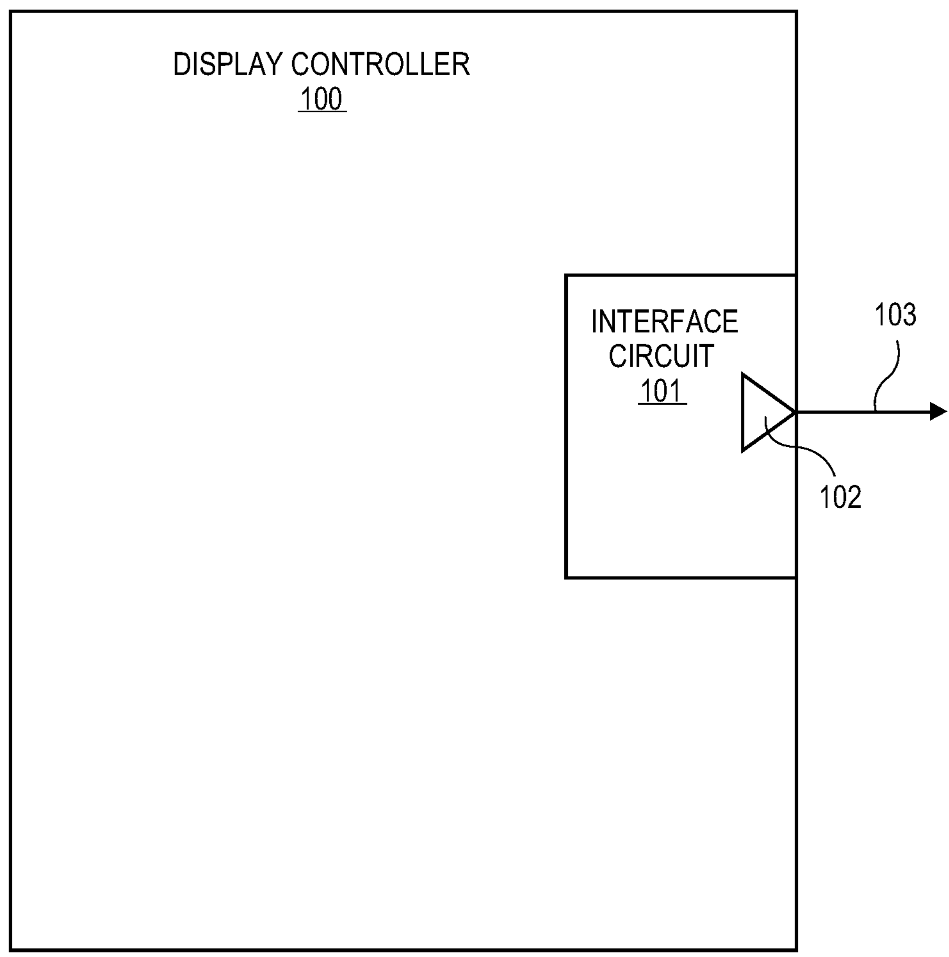
FIG. 1 shows a display controller with an interface circuit.

FIG. 1 shows a display controller 100 having an interface circuit 101 capable of supporting multiple, different interface standards. Importantly, the interface circuit 101 does not contain a separate, unique circuit for each different interface. More specifically, there does not exist a separate, isolated driver and I/O for each different interface that is supported. Rather, "transistor sharing" is exhibited within the driver circuitry 102 such that there exists within the driver 102 at least one transistor that drives the signals of more than one interface standard. Also, the driver circuitry 102 (in the particular embodiment depicted in FIG. 1) only drives a single I/O 103 such that the signals of all the different supported interface standards can flow through the single I/O 103.

The end user of the semiconductor die is expected to select one of these standards and, by so doing, cause a particular configuration to be determined for the die. The specific configuration determines the particular type of signaling that will flow through the single I/O 103 (i.e., the signaling specific to the particular interface that the user selected). For convenience, driver 102 represents the driver of a single lane. Those of ordinary skill will appreciate that even though only a single driver 102 is depicted, display interfaces typically allow for multiple lanes where each lane has its own respective driver. Thus, in implementation, there may be multiple drivers (one for each lane) but for ease of drawing the driver circuitry for only one lane has been depicted in FIG. 1.

Figure 2:
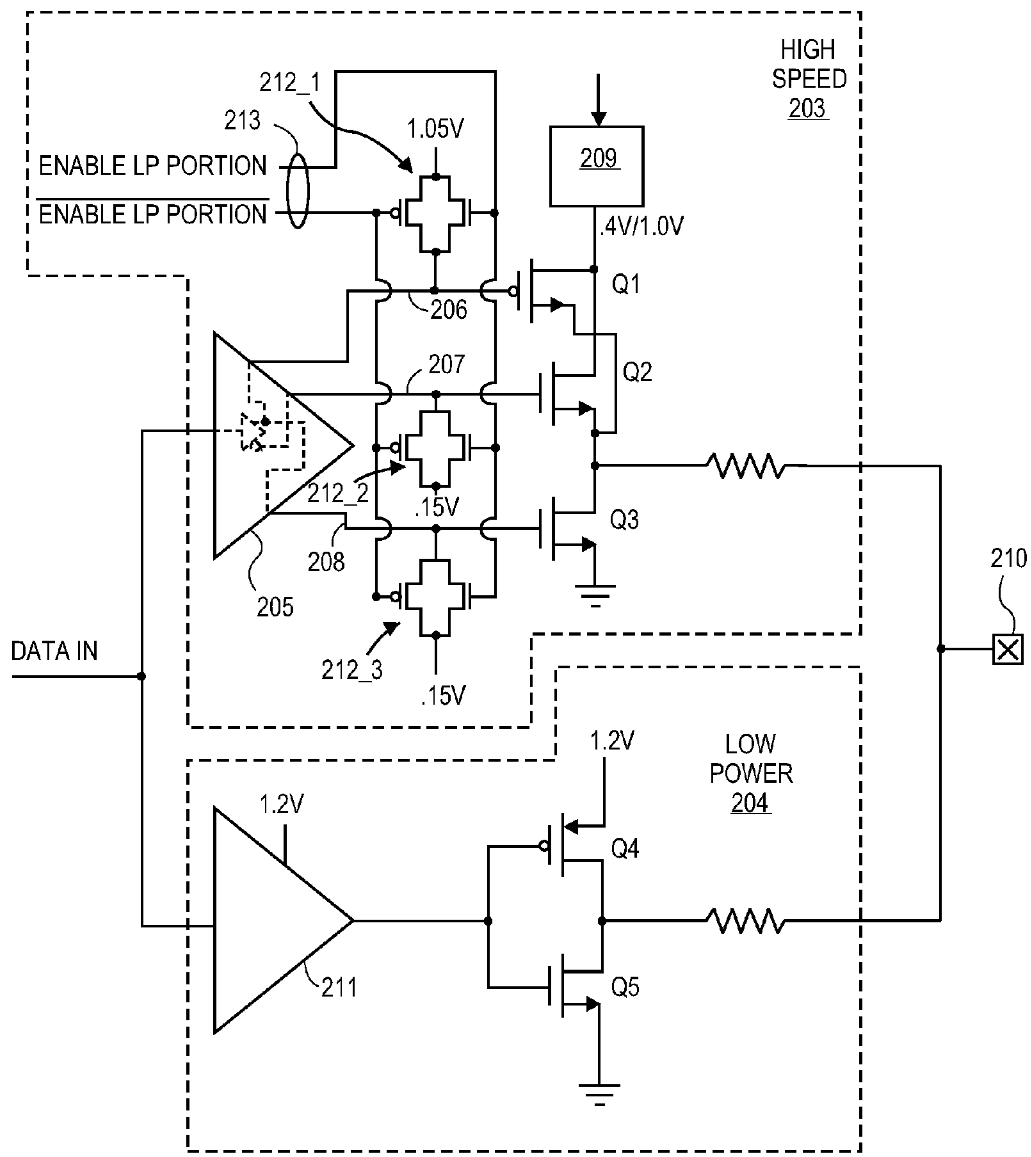
FIG. 2 shows driver for an interface circuit.

In an embodiment the driver 102 is actually a differential driver having both + and − outputs (and therefore actually drives two I/Os). FIG. 2 shows an embodiment 202 of the portion of the driver that drives the +output. In an implementation, the + driver 202 of FIG. 2 is designed to drive the + signal for each of: 1) DP; 2) eDP; 3) HDMI; 4) high speed MIPI DSI; and, 5) low speed MIPI DSI.

The design of FIG. 2 can be viewed as having a first portion 203 designed to drive high speed signals, and, a second portion 204 designed to drive low speed signals. According to one implementation, the high speed signals include: 1) DP (which operates with 750 mvpp signals at line speeds up to 5.4 Gbps); 2) eDP (which operates with 300 mvpp signal amplitudes at line speeds up to 5.4 Gbps); 3) HDMI (which operates with 750 mvpp signal amplitudes at line speeds up to approximately 6 Gbps); and, 4) high speed MIPI DSI (which operates with 300 mvpp signal amplitudes at line speeds up to 1.5 Gpbs) (Here, "mvpp" corresponds to "millivolts peak to peak" and "Gbps" corresponds to "Gigabits per second"). Thus, to summarize, in a implementation, the high speed portion 203 is responsible for driving signals of different interfaces but each of whose signaling characteristics can be described as having less than 1000 mvpp signal amplitude and greater than 1 Gbps line speed.

The low speed portion 204 in an implementation is designed to drive a low power MIPI DSI signal that can drive signal amplitudes of 1300 mvpp but only reach speeds of up to 10 Mbps. Thus, the low speed portion 204 in an implementation can be characterized as driving signals having greater than 1000 mvpp amplitude but line speeds of less than 1 Gbps (or even 0.1 Gbps).

Certain semiconductor manufacturing processes now fabricate different complementary logic technologies on a single die. For example, a semiconductor manufacturing process might fabricate both a first complementary logic composed of "thick gate" p type and n type transistors and a second complementary logic composed of "thin gate" p type and n type transistors. Thin gate transistors have thinner gate oxides than thick gate transistors. As such, thin gate transistors have larger transconductance (and therefore can exhibit higher speeds) than thick gate transistors. By contrast thick gate transistors have larger breakdown voltages (and therefore can sustain higher gate/drain and gate/source voltages) than thin gate transistors.

As such, thin gate transistors are ideal for high speed, low voltage signals while thick gate transistors are ideal for low speed, high voltage signals.

Thus, in an embodiment, the transistors Q1, Q2, Q3 of the high-speed portion 203 are implemented with thin gate transistors, while, the transistors Q4, Q5 of the low speed portion are implemented with thick gate transistors. Consistent with this approach, the supply voltage provided to the pull-up/pull-down driver formed by transistors Q4 and Q5 in the low speed portion 204 (having thick gate transistors to drive a signal amplitudes greater than 1000 mvpp) is greater than 1V (in the particular implementation of FIG. 2, the supply voltage is 1.2V), while, the supply voltages provided to the pull-up/pull-down driver formed by transistors Q1, Q2 and Q3 are less than 1V.

Describing the operation of the high-speed portion 203 first, the high speed portion 203 can be described as having a pull-up/pull-down driver having two different types of pull-up transistors. Specifically, Q1 corresponds to a first type of pull-up transistor (a p type pull-up transistor), Q2 corresponds to a second type of pull-up transistor (an n type of pull-up transistor) and Q3 corresponds to the pull-down transistor. Recalling that the high speed portion in an implementation drives the signals for four different interface types (DP, eDP, HDMI and high speed MIPI DSI), the different interfaces themselves may specify different peak-to-peak voltages, which, in turn, can be handled by supplying the pull-up transistors with different supply voltages, where, a specific one of the types of pull-up transistors is used with a specific one of the supply voltages.

In particular, in an implementation where the DP and HDMI signals have 750 mvpp amplitudes and the eDP and high speed MIPI DSI signals have 300 mvpp amplitudes, a 1.0 V supply voltage is supplied to the Q1 pull-up transistor for DP and HDMI signals, whereas, a 0.4V supply voltage is supplied to the Q2 pull-up transistor for eDP and MIPI DSI signals. Here, the buffer 205 that drives the high speed pull-up/pull down transistors Q1-Q3 has: 1) a first "DP/HDMI" state that drives DP or HDMI data signals on line 206 while providing a voltage on line 207 that places Q2 in an off state; and, 2) a second "eDP/high speed MIPI DSI state" that drives eDP or high speed MIPI DSI data signals on line 207 while providing a voltage on line 206 that places Q1 in an off state. Data signals of all types (DP, HDMI, eDP and high speed MIPI DSI) are placed on line 208 regardless of which of lines 206, 207 is enabled to carry data (i.e., line 206 in the DP/HDMI state or line 207 in the eDP/high speed MIPI DSI state).

Note that Q1 is a p type transistor while Q2 is an n type transistor. Because of the use of different pull up transistor polarities, different logical schemes are used for the two different states of buffer 205 discussed above. In particular, since Q1 is a p type pull-up transistor, when in the first (DP/HDMI) state, signals are placed on line 206 that are logically the same as the signals that are placed on line 208. That is, when a logic "high" is presented on line 208 (to turn Q3 "on" and pull down the logic level on output line 210) a logic "high" is also presented on line 206 (to turn Q1 "off" to prevent the 1.0V supply voltage from influencing the output line 210). Likewise, when a logic "low" is presented on line 208 (to turn Q3 "off" to prevent the ground reference from influencing output line 210) a logic "low" is also presented on line 206 (to turn Q1 "on" to drive output line 210 with the 1.0V supply voltage).

By contrast, when operating in the second (eDP/high speed MIPI DSI) state, signals are placed on line 206 that are logically opposite to the signals that are placed on line 208. That is, when a logic "high" is presented on line 208 (to turn Q3 "on" and pull down the logic level on output line 210) a logic "low" is also presented on line 207 (to turn Q2 "off" to prevent the 0.4V supply voltage from influencing the output line 210). Likewise, when a logic "low" is presented on line 208 (to turn Q3 "off" to prevent the ground reference from influencing output line 210) a logic "high" is presented on line 207 (to turn Q2 "on" to drive output line 210 with the applied voltage on line 207 less the gate-source forward bias voltage. In an embodiment, the applied voltage on line 207 for a logic high in the eDP/high speed MIPI DSI state is 1.05V. Accounting for a gate-to-source forward bias drop of 0.65 V for Q2, exactly 0.3V is driven on output line 210.

In an embodiment, a low drop out voltage regulator 209 is used to supply 1.0V or 0.4 to the Q1/Q2 network depending on whether the buffer 205 is in the DP/HDMI state or the eDP/high speed MIPI DSI state (1.0V in the case of the former, 0.4V in the case of the later).

Referring to the low speed portion 204, a standard pull-up/pull-down driver is observed with thick gate transistors Q4 and Q5. The pull-up/pull-down driver is driven by buffer 211. Both the buffer 211 and the driver are supplied with a 1.2V supply voltage. When the low speed portion is activated to enable the low power MIPI interface, buffer 205 within the high speed portion 203 enters a high output impedance state.

A problem, however, is that the low speed portion 204 can drive output line 210 to reach voltages as high as 1.3V (because the 1.2V supply voltage can actually reach 1.3V in worst case circumstances). Recalling that transistors Q1, Q2 and Q3 within the high speed portion 203 are thin gate transistors and therefore have lower gate dielectric breakdown voltages, without any protective circuitry, transistors Q1, Q2 and Q3 could conceivably suffer gate dielectric breakdown if the low speed portion 204 were to drive output line 210 to 1.3V.

As such, protective circuits 212_1, 212_2 and 212_3 are introduced to the high speed portion 203 to ensure that the gate dielectrics of transistors Q1, Q2 and Q3 do not exceed their associated breakdown voltages. Protective circuits 212_1, 212_2 and 212_3 are essentially switch circuits that, under the control of control signal 213 are "open" to permit a protective bias voltage on lines 206, 207, 208 when the low speed portion 204 is enabled, or, "closed" to prevent the protective bias voltages from reaching lines 206, 207, 208 when the high speed portion 203 is active.

As observed in FIG. 2, protective circuit 212_1 supplies line 206 with a voltage of 1.05 V when the low power portion 204 is enabled. As such, when the low power portion drives output line 210 to the ground reference, a bias of only 1.05V is placed across the drain/source junction of Q1 which is within the breakdown voltage rating for the thin gate transistors. Likewise, protective circuits 212_2 and 212_3 drive lines 207 and 208 respectively to 0.15 V when the low power portion is enabled. Should the low power portion 204 drive output line 210 to a worst case 1.3V, the gate-source junction voltage of Q2 and the gate-drain voltage of Q3 will only reach a voltage of 1.15V which is also within the breakdown specification of the thin gate transistors.

Thus, with the help of the protective circuits 212_1, 212_2, 212_3, high speed and low speed portions 203, 204 can be integrated into a single driver.

FIG. 3 provides a chart showing the different states of the driver. In the low power MIPI state, active data signals are provided to transistors Q4 and Q5, the protective circuits are in a closed state and the high speed driver 205 is in a high output impedance state. In the high speed state, buffer 211 turns transistors Q4 and Q5 off. The high speed state has two sub states: DP/HDMI and eDP/high speed MIPI DSI. In the DP/HDMI state, the voltage regulator provides a 1.0V to the high speed pull-up/pull-down driver and buffer 205 drives active data signals into Q1 and Q3. Q2 is off. In the eDP/high speed MIPI DSI state, the voltage regulator provides 0.4 V to the pull-up/pull-down driver, active data signals are provided to Q2 and Q3 and Q1 is off. The different states may be effected with control register space of one or more control registers of the display controller (not shown) that can be set, e.g., through software. The control register(s) are coupled to buffers 205 and 211 which effect the different states of the driver as depicted in the chart of FIG. 3 in response.

Figure 4:
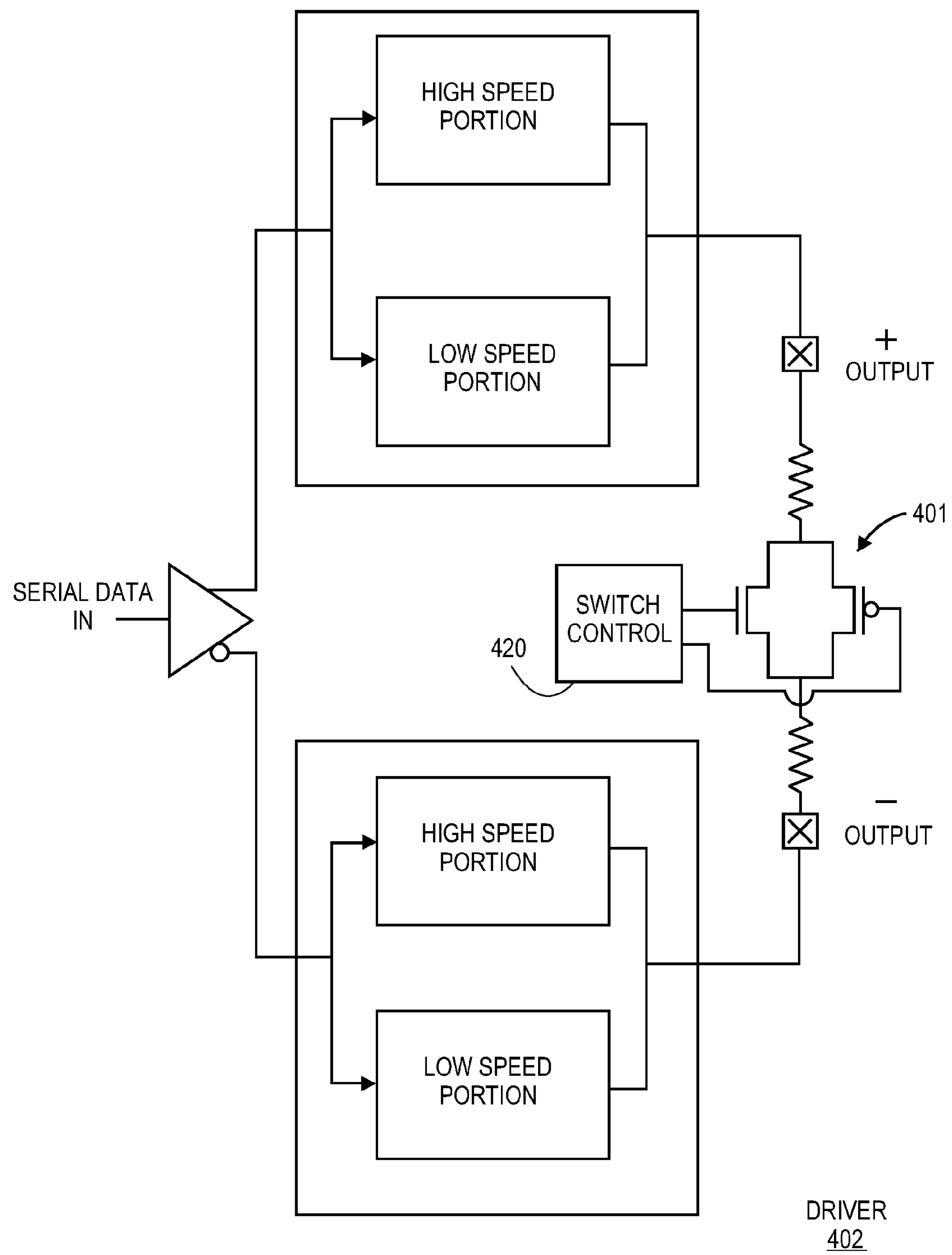
FIG. 4 shows a fully differential driver.

FIG. 4 shows the design for a fully differential driver 402. The fully differential driver essentially adds, as compared to the circuit of FIG. 2, a second driver circuit to provide the—signal component of the differential signal. Note the presence of output switch 401. Output switch 401 is nominally "open" in most modes to isolate the + and − channels. When the driver is configured to drive eDP signals, however, the switch 401 is "closed" to provide capacitive coupling between the + and − channels that properly shapes the eDP output signal in terms of both pre-emphasis and voltage swing. Switch control 420 controls the switch in accordance with whether the eDP mode has been selected or in. As such, the switch control may also be coupled to the aforementioned register space.

Figure 5:
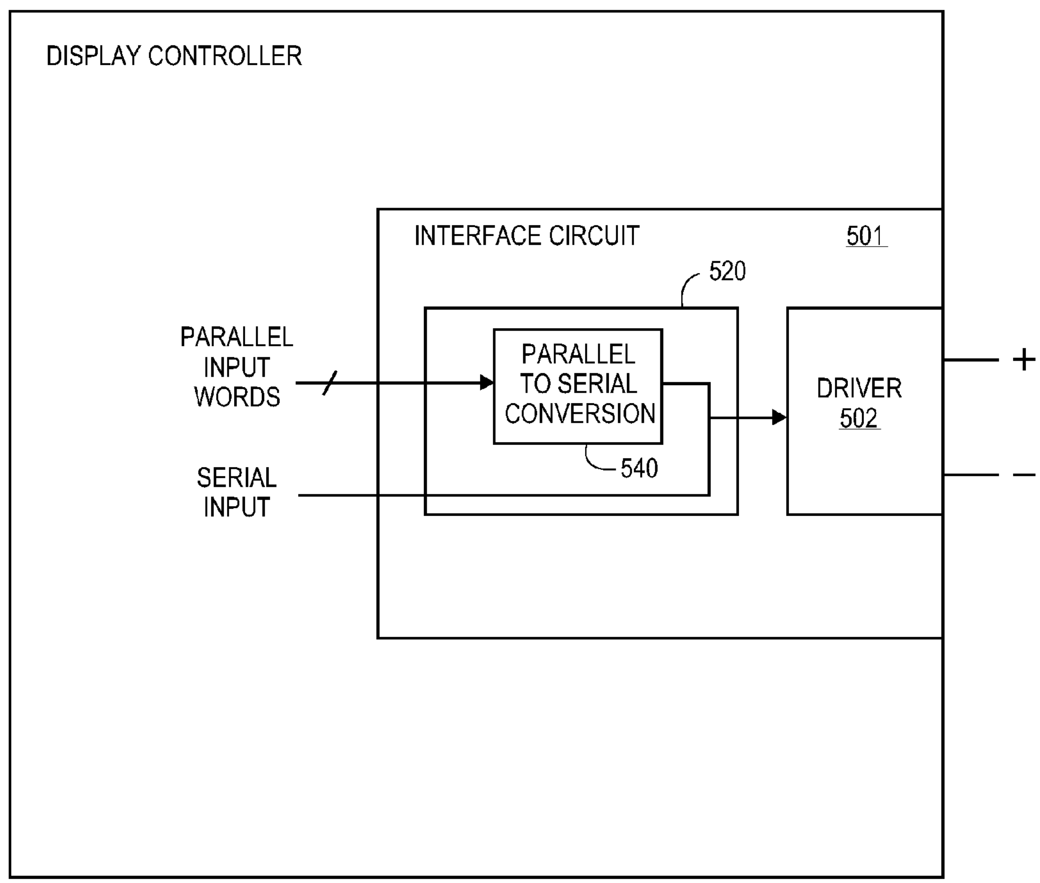
FIG. 5 shows an interface circuit having a driver and a PHY circuit.

FIG. 5 shows a simplistic view of the PHY channel logic 520 within the interface circuit 501 used to process the data presented from the display controller core to the driver 502. As observed in FIG. 5, the data can be presented to the PHY channel logic 520 either serially or in parallel words depending on the specific display interface that has been selected. For instance, according to one embodiment, DP and eDP data is presented to the PHY channel 520 in 10 bit wide parallel words, while HDMI and MIPI data is presented to the PHY channel 520 as a serial data stream. As such there exists in the PHY parallel to serial conversion circuitry 540 that is used in the PHY channel for DP and eDP configurations but is bypassed for HDMI and MIPI configurations. Those of ordinary skill will be able to determine other components of a PHY channel that are not specifically depicted in FIG. 5.

Importantly the display controller discussed herein can be instantiated into a semiconductor chip that is designed to interface with a display. Examples include media system on chips (SOCs), processors (including multi-core processors), application specific integrated circuits (ASICs), Display protocol converters (CE) among a multitude of other possible applications.

Figure 6:
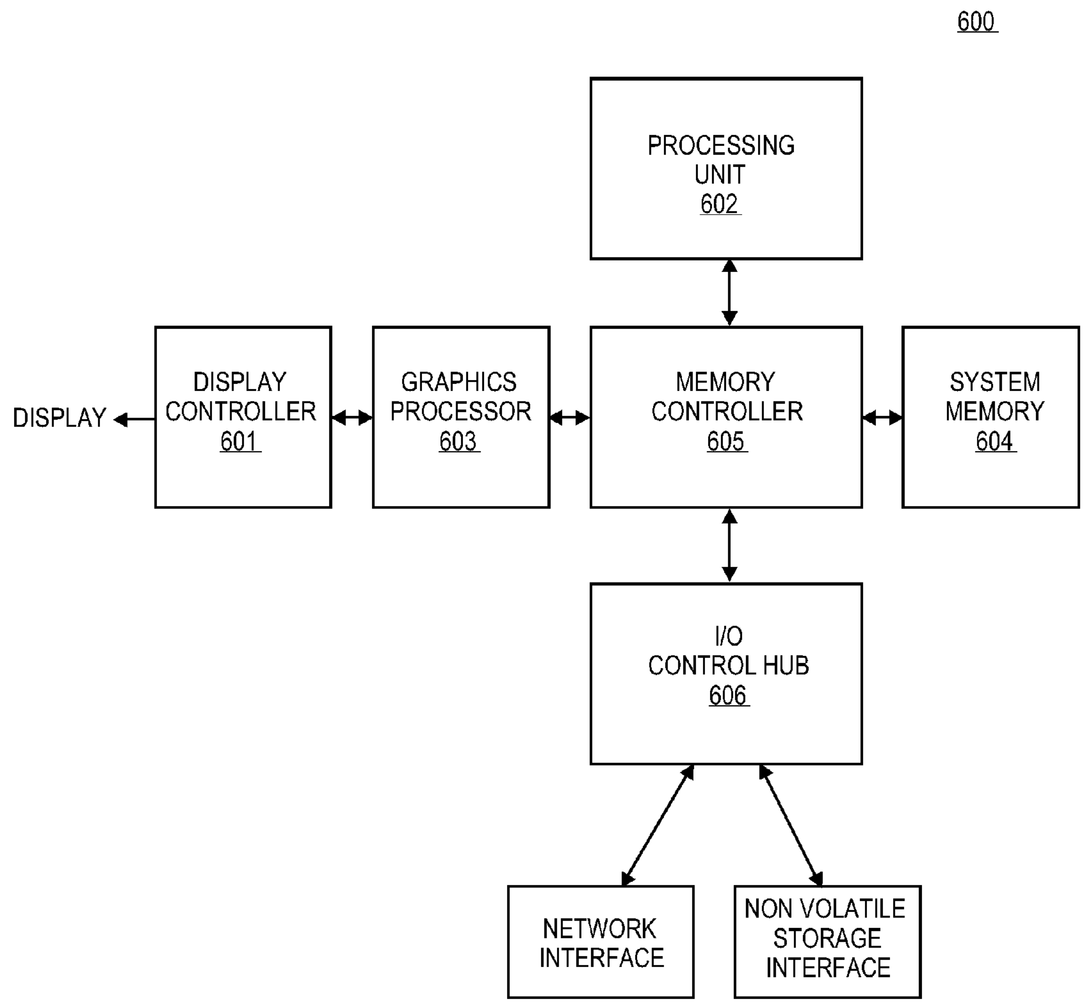
FIG. 6 shows a computing system.

FIG. 6 shows a computing system 600 having a display controller 601. The computing system contains a processing unit 602 which may contain, e.g., one or more general purpose (or other) processing cores. The computing system also contains a graphics processor 603 to off-load graphics intensive tasks from the processing unit. The graphics processor 603 is coupled to the display controller 601. The graphics controller 603 may have its own local memory to store its instructions and/or data. Alternatively or in combination the graphics processor may store instructions and/or data in system memory 604. Memory controller 605 controls the management of the multiple streams of requests and responses to/from system memory by the processing unit 602, the graphics processor and/or the I/O control hub 606. Note that the display controller may interface to various forms of display such as a thin film transistor display, a liquid crystal display, a light emitting diode display, etc.

The above described description describes a semiconductor chip that includes a display controller having a driver, the display controller being configurable to select a first, a second, a third and a fourth different display interface, the driver designed to drive respective signals for each of the first, second, third and fourth interfaces through a single output. The driver in an embodiment comprises a high speed pull-up/pull-down driver and a low power pull-up/pull-down driver whose respective outputs are coupled to the output. In an embodiment, the high speed pull-up/pull-down driver is composed of transistors whose gate dielectrics are thinner than the low power pull-up/pull-down driver's transistors.

In an embodiment the transistors of the high speed pull-up/pull-down driver are coupled to protective switch circuits that provide a respective protective bias voltage to prevent dielectric breakdown when the low speed pull-up/pull-down driver is active. In an embodiment the high speed pull-up/pull-down driver comprises first and second pull-up transistors, a first of the pull-up transistors to drive data for a first subset of the different display interfaces, a second of the pull-up transistors to drive data for a second subset of the different display interfaces. In an embodiment the first, second, third, fourth and a fifth display interface supported by the driver are DP, HDMI, eDP, high speed MIPI DSI and low power MIPI DSI. In an embodiment the display controller comprises a PHY channel coupled in front of the driver, the PHY channel having a path comprising a parallel to serial converter to process data of one of the first, second, third, fourth and fifth display interfaces received at the PHY as parallel words, the channel having a bypass path that causes data of another one of the first, second, third, fourth and fifth display interfaces to bypass the parallel to serial converter, the data of the another one of the display interfaces received at the PHY as a serial stream.

A method is described that includes selecting one from a first, second, third and fourth display interface, the selected one display interface having a lower power than the unselected ones of the display interfaces; disabling transistors of a high speed portion of a display interface driver in response to the selecting, the disabling including providing bias voltages to gates of the transistors of the high speed portion to prevent gate dielectric breakdown of the transistors while a low speed portion of the display interface driver is driving data signals of the selected one display interface; and, driving data signals of the selected one display interface through an output, wherein voltages of the data signals also reach the transistors.

In an embodiment the first, second, third, fourth and a fifth display interface supported by the driver are DP, HDMI, eDP, high speed MIPI DSI and low power MIPI DSI. In an embodiment the transistors have a thinner gate dielectric than transistors that are driving the signals. In an embodiment the method includes providing a first one of the bias voltages to a p type pull-up transistor and providing a second one of the bias voltages to an n type pull-up transistor.

A computing system is described that includes a processing unit; a memory controller coupled to a system memory; a graphics controller; a display controller coupled to the graphics controller, the display controller having a driver, the display controller being configurable to select a first, a second, a third and a fourth different display interface, the driver designed to drive respective signals for each of the first, second, third and fourth interfaces through a single output. In an embodiment the driver comprises a high speed pull-up/pull-down driver and a low power pull-up/pull-down driver whose respective outputs are coupled to the output. In an embodiment the high speed pull-up/pull-down driver is composed of transistors whose gate dielectrics are thinner than the low power pull-up/pull-down driver's transistors. In an embedment the transistors of the high speed pull-up/pull-down driver are coupled to protective switch circuits that provide a respective protective bias voltage to prevent dielectric breakdown when the low speed pull-up/pull-down driver is active.

In an embodiment the high speed pull-up/pull-down driver comprises first and second pull-up transistors, a first of the pull-up transistors to drive data for a first subset of the different display interfaces, a second of the pull-up transistors to drive data for a second subset of the different display interfaces. In an embodiment the first, second, third, fourth and a fifth display interface supported by the driver are DP, HDMI, eDP, high speed MIPI DSI and low power MIPI DSI. In an embodiment the display controller comprises a PHY channel coupled in front of the driver, the PHY channel having a path comprising a parallel to serial converter to process data of one of the first, second, third, fourth and fifth display interfaces received at the PHY as parallel words, the channel having a bypass path that causes data of another one of the first, second, third, fourth and fifth display interfaces to bypass the parallel to serial converter, the data of the another one of the display interfaces received at the PHY as a serial stream.

In the foregoing specification any of the components and/or processes discussed above can be implemented with electronic circuitry such as a logic circuitry disposed on a semiconductor chip and/or storage circuitry (e.g., register circuitry, memory cell circuitry, etc.) for any such circuit described above that is used to hold information (such as the centralized TLB and centralized shadow tag array). In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

selecting one from a first display interface and a second display interface, said selected one display interface having a lower power than the unselected display interface;

disabling transistors of a high speed portion of a display interface driver in response to said selecting, said disabling including providing bias voltages to gates of said transistors of said high speed portion to prevent gate dielectric breakdown of said transistors while a low speed portion of said display interface driver is driving data signals of said selected one display interface; and driving data signals of said selected one display interface through an output, wherein voltages of said data signals also reach said transistors.

2. The method of claim 1 wherein said first display interface and said second display interface supported by said display interface driver comprise DP, HDMI, eDP, high speed MIPI DSI, or low power MIPI DSI.

3. The method of claim 1, wherein said transistors have a thinner gate dielectric than transistors that are driving said data signals.

4. The method of claim 1, further comprising providing a first one of said bias voltages to a p type pull-up transistor and providing a second one of said bias voltages to an n type pull-up transistor.

5. A method comprising:

selecting, with a display controller coupled to a driver, between a first display interface and a second display interface of a plurality of different display interfaces; and driving respective signals with said driver for each of said first and second display interfaces through a single output, wherein said driver comprises a high speed pull-up/pull-down driver and a low power pull-up/pull-down driver whose respective outputs are coupled to said single output, and said driver comprises first and second pull-up transistors, the first pull-up transistor to drive data for a first subset of said plurality of different display interfaces, and the second pull-up transistor to drive data for a second subset of said plurality of different display interfaces.

6. The method of claim 5, wherein the first display interface is a serial interface and the second display interface is a parallel interface.

7. The method of claim 5, wherein said high speed pull-up/pull-down driver comprises transistors whose gate dielectrics are thinner than transistors of said low power pull-up/pull-down driver.

8. The method of claim 7, further comprising coupling said transistors of said high speed pull-up/pull-down driver to protective switch circuits that provide a respective protective bias voltage to prevent dielectric breakdown when said low power pull-up/pull-down driver is active.

9. The method of claim 5, wherein the first display interface is an embedded Display Port (eDP) interface and the second display interface is a Mobile Industry Processor Interface (MIPI) Display Serial Interface (DSI).

10. The method of claim 5, wherein said first display interface and said second display interface comprise display port (DP), High Definition Multimedia Interface (HDMI), eDP, high speed MIPI DSI, or low power MIPI DSI.

11. The method of claim 5, wherein said display controller comprises a PHY channel coupled to said driver, said PHY channel having a path comprising a parallel to serial converter to process data of said second display interface received at said PHY channel as a parallel stream, said PHY channel having a bypass path causing data of said first display interface to bypass said parallel to serial converter, said data of said first display interface received at said PHY channel as a serial stream.

12. A method comprising:

selecting, with a display controller coupled to a driver, between a first display interface and a second display interface of a plurality of different display interfaces; and driving respective signals for each of said first and second display interfaces through a single output, wherein said display controller comprises a PHY channel coupled to said driver, said PHY channel having a path comprising a parallel to serial converter to process data of said second display interface received at said PHY channel as a parallel stream, said PHY channel having a bypass path to cause data of said first display interface to bypass said parallel to serial converter, said data of said first display interface received at said PHY channel as a serial stream.

13. The method of claim 12, wherein said driver comprises a high speed pull-up/pull-down driver and a low power pull-up/pull-down driver whose respective outputs are coupled to said single output.

14. The method of claim 13, wherein said high speed pull-up/pull-down driver comprises transistors whose gate dielectrics are thinner than transistors of said low power pull-up/pull-down driver.

15. The method of claim 14, the method further comprising coupling said transistors of said high speed pull-up/pull-down driver to protective switch circuits that provide a respective protective bias voltage to prevent dielectric breakdown when said low power pull-up/pull-down driver is active.

16. The method of claim 13, wherein said driver comprises first and second pull-up transistors, the first pull-up transistor to drive data for a first subset of said plurality of different display interfaces, and the second pull-up transistor to drive data for a second subset of said plurality of different display interfaces.

17. The method of claim 12 wherein one of the first display interface and the second display interface is an embedded Display Port (eDP) interface and the other of the first display interface and the second display interface is a Mobile Industry Processor Interface (MIPI) Display Serial Interface (DSI).

* * * * *